United States Patent
Zuev et al.

(10) Patent No.: US 8,170,371 B2
(45) Date of Patent: May 1, 2012

(54) METHOD OF IMAGE PRE-ANALYZING OF A MACHINE-READABLE FORM OF NON-FIXED LAYOUT

(75) Inventors: Konstantin Zuev, Moscow (RU); Ruslan Garashchuk, Moscow (RU)

(73) Assignee: ABBYY Software, Ltd, Nicosia (CY)

( * ) Notice: Subject to any disclaimer, the term of this patent is extended or adjusted under 35 U.S.C. 154(b) by 1228 days.

(21) Appl. No.: 10/603,216

(22) Filed: Jun. 26, 2003

(65) Prior Publication Data

US 2004/0190790 A1    Sep. 30, 2004

(30) Foreign Application Priority Data

Mar. 28, 2003   (RU) ................................ 2003108434

(51) Int. Cl.
  *G06K 9/00*   (2006.01)
  *G06K 9/36*   (2006.01)
(52) U.S. Cl. ......... 382/291; 382/112; 715/221; 715/243
(58) Field of Classification Search .......... 382/291–292, 382/112; 715/505–508, 900–911, 221–226, 715/243–254
See application file for complete search history.

(56) References Cited

U.S. PATENT DOCUMENTS

| | | | | |
|---|---|---|---|---|
| 5,025,484 A * | 6/1991 | Yamanari et al. | ............. | 382/311 |
| 5,182,656 A * | 1/1993 | Chevion et al. | ............... | 358/452 |
| 5,191,525 A * | 3/1993 | LeBrun et al. | ................ | 715/500 |
| 5,235,654 A * | 8/1993 | Anderson et al. | ............. | 382/180 |
| 5,257,328 A * | 10/1993 | Shimizu | ......................... | 382/311 |
| 5,416,849 A * | 5/1995 | Huang | .......................... | 382/173 |
| 5,748,809 A * | 5/1998 | Hirsch | .......................... | 382/317 |
| 5,793,887 A * | 8/1998 | Zlotnick | ....................... | 382/209 |
| 6,640,009 B2 * | 10/2003 | Zlotnick | ....................... | 382/224 |
| 6,760,490 B1 * | 7/2004 | Zlotnick | ....................... | 382/311 |
| 6,778,703 B1 * | 8/2004 | Zlotnick | ....................... | 382/218 |
| 7,046,848 B1 * | 5/2006 | Olcott | ........................... | 382/176 |
| 7,149,347 B1 * | 12/2006 | Wnek | ............................ | 382/159 |
| 7,561,734 B1 * | 7/2009 | Wnek | ............................ | 382/159 |
| 7,764,830 B1 * | 7/2010 | Wnek | ............................ | 382/159 |
| 2002/0106128 A1 * | 8/2002 | Zlotnick | ....................... | 382/224 |
| 2007/0076984 A1 * | 4/2007 | Takahashi et al. | ............ | 382/305 |
| 2008/0025618 A1 * | 1/2008 | Minagawa et al. | ........... | 382/229 |
| 2008/0205742 A1 * | 8/2008 | Lund | ............................. | 382/141 |

* cited by examiner

*Primary Examiner* — Aaron W Carter
(74) *Attorney, Agent, or Firm* — John C. Meline

(57) ABSTRACT

A method for pre-recognition processing of forms with non-fixed fields. One or more objects that are present on a form can be reliably identified after conversion of the form into an electronic state. Objects are preliminarily assigned to act as reference points for spatial binding of data input fields or groups thereof. In the case of a text object as a reference point, text recognition is additionally performed. The spatial location of a reference point may be not fixed. A reference point may be described as alternative. Field identification may be performed either automatically or manually.

12 Claims, 2 Drawing Sheets

FIG. 1

BANK
Phone:

Wire/Funds Transfer Payment Order

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

ORIGINATING LOAN PROCESS DATA

Charge/Paid (if necessary)
Date (MM.DD.YY):

Entered By: _____
Verified By: _____

Internal Use

FTN

INTERMEDIARY BANK DATA

ABA/Routing Number:
SWIFT CODE: UNCRIT2B912
Account name or Bank: The Bank of New York    New York
Branch Information: PASCO YORK08IDONIC corr acc 1040-998-973

BENEFICIARY BANK DATA

ABA / Routing Number:
SWIFT CODE:
Account name or Bank:
Branch Information:

BENEFICIARY DATA

Beneficiary Name: VASILY BORISOV found in ULYINSKY branch
Address: 7 Lanbrua muche Rua  February 101000 Russian Federation
Account Number: RUINSKY la musician account #51300890197419992001
Routing #: account#12301230551607100024640 Floua. WANOVA

PROCESSING ENTRIES

Send From Acct: _____
Fee Amt: $YYYYYY
Amt CL: $15.00
Address of Bank: $YYYYYY
Bank Code: X 02345
Entries Made By:

ORIGINATOR DATA

Member Name: Faruk Gutuubu
Address: 1216 E Miradoura Arm AHKARA
Phone Number: +1 (096) 111-22-33
Account: 1117100226
Dollar Amt: $110.00
X (signature) _____    #1 (111111)

Wire/Funds Transfer Payment Order      FIG. 2

BANK
Phone:

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

Charge/Paid (if necessary)
Date (MM.DD.YY):

Entered By: _____ Internal Use
Verified By: _____

FTN

ORIGINATING LOAN PROCESS DATA

INTERMEDIARY BANK DATA

ABA / Routing Number:
SWIFT CODE: UNCRIT2B912
Acct name or Bank: The Bank of New York    New York
Branch Information: PASCO YORK08IDONIC corr acc 1040-998-973

BENEFICIARY BANK DATA

ABA / Routing Number:
SWIFT CODE:
Account name or Bank:
Branch Information:

BENEFICIARY DATA

Beneficiary Name: VASILY BORISOV found in ULYINSKY branch
Address: 7 Lanbrua muche Rua   February 101000 Russian Federation
Account Number: RUINSKY la musician account #51300000197419992001
Routing #: account#123012008093071002464 Floua. IVANOVA

PROCESSING ENTRIES

Send From Acct: _____
Fee Amt: $020.04
Amt CL: $19.00
Address of Bank: $YYYYYY
Bank Code: 0012345
Entries Made By: _____

ORIGINATOR DATA

Member Name: Faruk Gutuubu
Address: 1216 E Miradoura Arm AHKARA
Phone Number: +1 (096) 111-22-33
Account: 1117100226
Dollar Amt: $110.00
X (signature) _____ #1 (111111)

METHOD OF IMAGE PRE-ANALYZING OF A MACHINE-READABLE FORM OF NON-FIXED LAYOUT

BACKGROUND OF THE INVENTION

1. Field of the Invention

The present invention relates generally to an optical character recognition of machine-readable forms, and in particular methods of pre-recognition analysis, especially when fields' and other elements' location is not strongly fixed.

2. Prior Art

A widespread method of document pre-recognition processing comprises parsing the image into regions, containing text, and regions containing non-text objects.

Developers of the known systems follow the path of restriction and simplification of document structure, in order to apply existing image structural identification methods.

A U.S. Pat. No. 5,864,629 (Jan. 26, 1999, Wustmann) discloses a method of marking out a particular part of document logical structure for the case, when special characters are present in some document regions and are not present in others. The method is illustrated by the example of regions containing character "$".

The method is not enough universal and can be narrowly applied only for special cases.

A U.S. Pat. No. 6,507,671 (Jan. 14, 2003, Kagan, et al.) discloses a method of marking out filled in data input fields of the document. The method is illustrated by the example of standard machine-readable form, of fixed layout.

The method can be applied only for machine-readable forms of fixed layout. It is rather complicated since the step of logical structure mark out is combined with the step of intelligent text recognition in data input fields.

Methods using fields fixed layout property of a form are often used in form identification, but have important drawback consisting in fitness thereof for the only specially designed machine-readable form.

For example, the method of U.S. Pat. No. 5,822,454 (Oct. 13, 1998, Rangarajan) discloses the way of pre-processing a document of the only fixed form—"INVOICE". The document has the strongly fixed form either by the fields list, or by their properties and layout.

The shortcomings of the method lay in unfitness for processing any other form of document except the invoice form and also inability to change the fields list or overcome spatial deflection of fields.

SUMMARY OF THE INVENTION

One or more graphic and/or text elements in the image of machine-readable form are preliminarily assigned to be used further as reference points for searching data input fields. Information about reference points spatial characteristics and data input fields relative location is placed in special storage means.

A machine-readable form image of a filled paper form is parsed into regions containing data input fields, connected regions, lines and other kinds of objects. Then the reference points' location is defined on the form image. In a case of multiple fields identification result the most closely matching field is selected. The fitness is measured in relation with spatial characteristics mainly.

BRIEF DESCRIPTION OF THE DRAWING

FIG. 1 shows a document with three assigned reference points.

FIG. 2 shows a spatial binding of a data input field with one of the reference points.

DETAILED DESCRIPTION OF THE INVENTION

A data conversion from paper media into electronic form is processed now by optical character recognition (OCR) systems. Nowadays OCR systems can reliably enough recognize documents of high and middle quality level, typed by any of the standardized font. This provides to convert a large amount of text data, with sometimes no manual control. But a character-by-character conversion is deficient for data transformation into electronic form. That's why the main common target of the prior systems is the document logical structure identification, i.e. evident identification of document's elements properties—title, data input fields, etc.

The main difficulty herein is due to deficient of the existing paper documents regulation. Even if the list of document fields if strongly prescribed (defined, fixed), as, for example, in money order, invoice, tax return or other account document form, the fields location areas are specified only approximately with some tolerance.

Additionally the exact fields location can be hardly assured in a mass typing. Thus, the problem of printed documents logical structure identification comes to the document pre-recognition process.

Spatially the document is formed of structural elements as text regions, various graphic objects and separating lines. Some text regions relate to document fields. Other text regions, graphical objects and separating lines relate to form.

The spatial structure properties can be described by means of spatial and parametric characteristics of structural elements:

structural element absolute layout restrictions,
structural element relative layout restrictions,
structural element dimensions variety restrictions,
structural element is optional.

An absolute structural element location is typical for questionnaires and other standard forms. At the same time the relative location thereof is fixed as well. But the problem of accurate whole-page location as distortion, shift and turn caused by scanning remains unsolved. In other cases restrictions of absolute location can be used for elimination fully incorrect versions of structural elements identification.

The relative limitations may be divided into two groups:
qualitative restrictions,
quantitative restrictions.

The qualitative restrictions show the general type of relationship, for example, that one element is located upper or lower then the other one. The qualitative restrictions specify coordinates of the region, where an element is located relatively to another element. Usually, the qualitative restrictions indicate small mutual location deflections as well. In other cases the qualitative relationship is used.

Sometimes a form structural requirements are not strong enough and do not fix the mutual location of elements, thus permitting the structural variations.

A most widespread type of structural variations is an absence of one or more structural element in the image. Usually this happened due to the optional nature of its presence.

Besides this some elements may also degrade at scanning, that makes their identification impossible. The examples of elements of this kind are separating lines or text elements of the form, typed in small font. Nevertheless the use of such elements is important since they can additionally specify the other elements' location.

The technical result of the present invention consists in improving an ability to process pre-recognition of machine-readable forms of non-fixed layout.

The mentioned shortcomings greatly reduce the use of known methods to find and mark out data input fields in the image of the form of non-fixed layout.

All known methods are unfit to achieve the declared technical result.

The declared technical result is achieved as follows.

One or more graphic and/or text elements (1) are preliminarily assigned on a form to be used further as reference points for searching data input fields (2).

The assigned elements (1) should be reliably identified on the scanned image.

Information about reference points spatial characteristics and data input fields (2) relative location is placed in a storage means, one of the possible embodiments of which is the form model description.

Additionally, the form model description contains parametrical data about data input fields, for example, the length of the field, the range of permissible values etc.

The graphic image of the machine readable form, after possible skew, distortion and noise elimination, is parsed into regions containing data input fields, connected regions, lines, other objects.

Then the location of objects previously assigned as reference points is determined. In the case the reference point is a text object its contents is additionally recognized.

The data input fields location is determined relatively to one or more reference point. If a full or a part covering thereof happens to similar fields and/or fields of the same type, the most suitable one of them should be chosen. The suitability is measured by the closeness of spatial characteristics thereof to the model. The additional parametrical information about data input fields may also be added if necessary.

The identification is processed by means of setting up and accepting hypothesis about the field.

A reliability estimation of the identification versions, i.e. hypotheses, is processed as follows.

To compare and combine estimations of various structural elements, it is necessary to reduce them to a common scale. The reliability estimation is usually interpret as conditional probability likelihood estimation:

$$Q_t \sim p(t|I),$$

where t—is a structural element, I—is an image.

On the basis of probabilistic interpretation of reliability estimation the following can be accepted:

$$p(N|I) = p(N|t_1, \ldots, t_n) p(t_1|I) \ldots p(t_n|I),$$

where $p(t_i|I)$—is a probability of I-th element that is a component of composite element N, $p(N|t_1, \ldots, t_n)$—conditional probability likelihood estimation that the list of sub-elements comprises composite element N.

The identification reliability estimation of composite element is calculated according to the following rule:

$$Q = Q_R Q_1 \ldots Q_n,$$

Where $Q_i \sim p(t_i|I)$—is reliability estimation of i-th element or the composite element N.

$Q_R \sim p(N|t_1, \ldots, t_n)$—a relations estimation.

The value of $p(N|t_1, \ldots, t_n)$ corresponds with relations $Q_R$, which restrict sub-elements in the composite element. The relations should model a conditional reliability density function $p(N|t_1, \ldots, t_n)$. The said problem is solved using non-clear logic toolkit in the probabilistic interpretation. Logic operations are performed according to the following rules:

operation '∧' is performed as: $A \wedge B \rightarrow a*b$;
operation '∨' is performed as: $A \vee B \rightarrow a+b-a*b$;
operation '¬' is performed as: $\neg A \rightarrow 1-a$.

The conditional reliability density function is formed via partly linear approximation.

We claim:

1. A method of pre-processing of a machine-readable form with non-fixed fields layout, the method comprising:
   acquiring a bit-mapped image of the machine-readable form filled in with print in one or more non-fixed data input fields;
   identifying at least one form model, the at least one form model containing spatial and parametric properties of objects thereof;
   preliminarily assigning at least one object of the form as a reference point for spatial binding of at least one non-fixed data input field thereof;
   eliminating any skew, distortion and noise in the bit-mapped image;
   parsing the bit-mapped image into regions; and
   defining a spatial location of at least one non-fixed data input field relative to at least one reference point, wherein said defining the location of the at least one non-fixed data input field comprises:
   selecting a non-fixed data input field to search in the at least one form model;
   accepting from the at least one form model at least one reference point property for a spatial relative reference of the said data input field;
   searching and locating said at least one reference point on the form bit-mapped image;
   searching and locating the said data input field on the form bit-mapped image relative to at least one reference point taking into account all spatial and parametrical properties described in the form model; and
   identifying each data input field position in the case of multiple data input fields.

2. The method as recited in claim 1, wherein the said reference point is represented by a text region.

3. The method as recited in claim 2, wherein the said text region is additionally subjected to a text recognition.

4. The method as recited in claim 1, wherein in the case of multiple data input fields the said identification of each data input field is performed via setting up and accepting of hypotheses and compliance estimation of the form model.

5. The method as recited in claim 4, wherein an additional information about each of said non-fixed data input field is used.

6. The method as recited in claim 1, wherein a non-fixed data input field may be used as a reference point.

7. The method as recited in claim 1, wherein identifying each data input field in the case of multiple data input fields is performed at least partly manually.

8. The method as recited in claim 1, wherein the spatial location of a reference point is not fixed from a first scan of the machine-readable form to a second scan of the machine-readable form.

9. The method as recited in claim 1, wherein one reference point is used for spatial binding of more than one data input field.

10. The method as recited in claim 1, wherein the spatial binding of one data input field is performed relative to more than one reference point.

11. The method as recited in claim 1, wherein a reference point comprises more than one form object.

12. The method as recited in claim 1, wherein the identifying each data input field position in the case of multiple data input fields is a profound identification.

* * * * *